United States Patent
Kumar et al.

(10) Patent No.: US 9,735,401 B2
(45) Date of Patent: Aug. 15, 2017

(54) SEALED SODIUM-BASED THERMAL BATTERIES AND METHODS OF SEALING SAME

(71) Applicant: GENERAL ELECTRIC COMPANY, Schenectady, NY (US)

(72) Inventors: Sundeep Kumar, Bangalore (IN); Mohamed Rahmane, Niskayuna, NY (US); Neil A. Johnson, Niskayuna, NY (US); Patrick D. Willson, Niskayuna, NY (US); Raymond R. Cole, Niskayuna, NY (US); Timothy Yosenick, Niskayuna, NY (US); Thomas Angeliu, Niskayuna, NY (US); Tobias Juetting, Niskayuna, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 1117 days.

(21) Appl. No.: 13/852,690

(22) Filed: Mar. 28, 2013

(65) Prior Publication Data
US 2014/0295258 A1    Oct. 2, 2014

(51) Int. Cl.
*H01M 2/04*    (2006.01)
*H01M 2/02*    (2006.01)
(Continued)

(52) U.S. Cl.
CPC ....... *H01M 2/0447* (2013.01); *H01M 2/0252* (2013.01); *H01M 2/08* (2013.01);
(Continued)

(58) Field of Classification Search
CPC ............. H01M 2/0252; H01M 2/0447; H01M 10/3963
(Continued)

(56) References Cited

U.S. PATENT DOCUMENTS 8,048,571 B2    11/2011    Visco et al.
2009/0011331 A1    1/2009    Stringer et al.
(Continued)

FOREIGN PATENT DOCUMENTS

WO    9965642 A1    12/1999

OTHER PUBLICATIONS

Lu et al., "Sodium-Beta Alumina Batteries: Status and Challenges," JOM Journal of the Minerals, Metals and Materials Society, vol. 62, pp. 31-36, Sep. 9, 2010.
(Continued)

*Primary Examiner* — Basia Ridley
*Assistant Examiner* — James Erwin
(74) *Attorney, Agent, or Firm* — John P. Darling

(57) ABSTRACT

The present application provides configurations, components, assemblies and methods for sealing cells of sodium-based thermal batteries, such as NaMx cells. In some embodiments the cells may include an integrated bridge member hermetically sealed to an electrically conductive case and a ceramic collar of the cell to hermetically seal an anodic chamber of the cell. In some embodiments the cells may include the ceramic collar hermetically sealed to an electrolyte separator tube of the cell to hermetically seal the anodic chamber of the cell. In some embodiments the anodic chamber may be defined, at least in part, by the case, integrated bridge member, ceramic collar and electrolyte separator tube. In some embodiments the cells may include a current collector hermetically sealed to the ceramic collar, and a cap member hermetically sealed to the current collector tube to hermetically seal a cathodic chamber of the cell.

20 Claims, 4 Drawing Sheets

(51) Int. Cl.
*H01M 2/08* (2006.01)
*H01M 10/39* (2006.01)
*H01M 2/06* (2006.01)

(52) U.S. Cl.
CPC ....... *H01M 10/39* (2013.01); *H01M 10/3963* (2013.01); *H01M 2/065* (2013.01)

(58) Field of Classification Search
USPC ........................................................ 429/185
See application file for complete search history.

(56) References Cited

U.S. PATENT DOCUMENTS

| | | |
|---|---|---|
| 2011/0050235 A1 | 3/2011 | Bogdan, Jr. et al. |
| 2011/0236743 A1 | 9/2011 | Kumar et al. |
| 2011/0244303 A1 | 10/2011 | Rahmane et al. |
| 2013/0059176 A1* | 3/2013 | Stefani ................ H01M 10/399 429/50 |

OTHER PUBLICATIONS

Lu et al., "Advanced Materials for Sodium-Beta Alumina Batteries: Status, Challenges and Perspectives," Journal of Power Sources, vol. 195, pp. 2431-2442, 2010.
Mali et al., "New Ceramic Seal for Na/NiCl2 Cells," Journal of the American Ceramic Society, vol. 94, pp. 3346-3349, Jun. 4, 2011.
Mali et al., "Modification of Ceramic Components for the Sodium Nickel Chloride Battery," Energy Materials science-McMaster University, Location—Canada, 2011.

* cited by examiner

SEALED SODIUM-BASED THERMAL BATTERIES AND METHODS OF SEALING SAME

BACKGROUND

The present disclosure generally relates to configurations, components, assemblies and methods for sealing cells of sodium-based thermal batteries, such as NaMx cells.

High-temperature rechargeable batteries, such as sodium-based thermal batteries like sodium metal halide or sodium sulfur cells, typically have a number of components that need to be sealed, such as hermetically sealed, for the cell to work. Sodium metal halide (NaMx) batteries, for instance, may include cells including a sodium metal anode and a metal halide (NiCl2 for example) cathode. A beta"-alumina solid electrolyte (BASE) separator can be used to separate the anode and cathode. The solid electrolyte may allow the transport of sodium ions between anode and cathode. A secondary electrolyte (NaAlCl4) can also used in the cathode mixture. The cathode mixture typically consists of nickel and sodium chloride along with other additives. The cathode mixture is contained inside the BASE tube, which is closed or sealed on one end after filling. At operating temperatures the cathode mixture may be in a molten fluid or fluid-like form.

In present typical designs of sodium-based thermal battery cells, such as NaMx cells and sodium-sulfur cells, the open end of the beta"-alumina ceramic tube is joined to an alpha-alumina collar using a glass seal. Spinel, zirconia, yttria, or other ceramic insulators, or combinations thereof, may also be used as a collar material in NaMx cells. The alpha-alumina collar isolates electrically the anode from the cathode. In order to enable the sealing of this ceramic subassembly to the current collectors (anode and cathode), and thereby at least partially seal the cell, two metallic rings (typically Ni) are typically coupled or bonded to the alpha-alumina collar prior to the sealing glass operation. The inside Ni ring is then typically welded to a cathode current collector assembly, and the current collector assembly includes another weld. The outside Ni ring is typically welded to an anode current collector (e.g., the metallic battery case) via a metal (e.g., Ni) outer bridge member. The integrity (e.g., strength and/or hermeticity) of the glass seal joint between the beta"-alumina ceramic tube and the alpha-alumina collar, the weld between the inside metal ring and the cathode current collector, the weld within the cathode current collector assembly, the welds between the bridge member and the outer metal ring and the anode current collector (e.g., the battery case), and the metal-ceramic joints between the outer and inner metal rings and the ceramic collar are all critical for the function, reliability and safety of the cell. As a result, each joint or seal must be performed under particular conditions and process steps particular to the specific type of seal (weld, glass seal, metallization/thermal compression bonding (TCB), etc.) being used to ensure sealing (e.g., hermeticity). Further, each seal must be inspected and/or tested. The relatively large amount of seals or joints also inherently provides a relatively large number of failure points. Such prior sealing configurations or processes are thereby disadvantageous as they are time consuming, costly and include numerous potential failure points.

There continues to be a growing need in the art for high performance sodium-based batteries with lower fabrication costs and high reliability. Thus, sealing configurations, systems and methods that are capable of achieving typical sodium-based battery performance and reduce fabrication time, costs and potential failure points are desirable.

BRIEF DESCRIPTION

In accordance with one aspect of the present disclosure, a sub-assembly for at least partially sealing a cell of a sodium-based thermal battery is disclosed. The sub-assembly includes an electrically conductive case, electrolyte separator tube, a ceramic collar, and an integrated bridge member. The electrolyte separator tube positioned within the case and defines, at least in part, a cathodic chamber with an opening. The ceramic collar is positioned at the opening of the cathodic chamber of the electrolyte separator tube and defines an aperture in communication with the opening and the cathodic chamber. The electrically conductive case, electrolyte separator tube, ceramic collar, and integrated bridge member define, at least in part, an anodic chamber therebetween. The integrated bridge member is hermetically sealed and operable electrically coupled to the metal case and hermetically sealed to the ceramic collar to hermetically seal, at least in part, the cathodic chamber.

In accordance with another aspect of the present disclosure a sodium-based thermal battery with at least one cell including a hermetically sealed anodic chamber is disclosed. The battery includes an electrically conductive case, an electrolyte separator tube positioned within the case, a ceramic collar, and an integrated bridge member. The electrically conductive case, electrolyte separator tube, ceramic collar, and integrated bridge member define, at least in part, the anodic chamber therebetween. The integrated bridge member is hermetically sealed and operable electrically coupled to the metal case and hermetically sealed to the ceramic collar.

In accordance with another aspect of the present disclosure a method of at least partially sealing an anodic chamber a cell of a sodium-based rechargeable thermal battery is disclosed. The method includes obtaining an electrically conductive case. The method also includes positioning an electrolyte separator tube and a ceramic collar within the case such that the anodic chamber is formed, in part, between the case and the electrolyte separator tube and ceramic collar. The electrolyte separator tube defines a cathodic chamber. The method further includes hermetically sealing and operably electrically coupling an integrated bridge member to the case. Also, the method includes hermetically sealing the integrated bridge member to the ceramic collar.

These and other objects, features and advantages of this disclosure will become apparent from the following detailed description of the various aspects of the disclosure taken in conjunction with the accompanying drawings.

DRAWINGS

DETAILED DESCRIPTION

Each embodiment presented below facilitates the explanation of certain aspects of the disclosure, and should not be interpreted as limiting the scope of the disclosure. Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value. When introducing elements of various embodiments, the articles "a," "an," "the," and "said" are intended to mean that there are one or more of the elements. The terms "comprising," "including," and "having" are intended to be inclusive and mean that there may be additional elements other than the listed elements. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. Any examples of operating parameters are not exclusive of other parameters of the disclosed embodiments. Components, aspects, features, configurations, arrangements, uses and the like described, illustrated or otherwise disclosed herein with respect to any particular embodiment may similarly be applied to any other embodiment disclosed herein.

Figure 1:
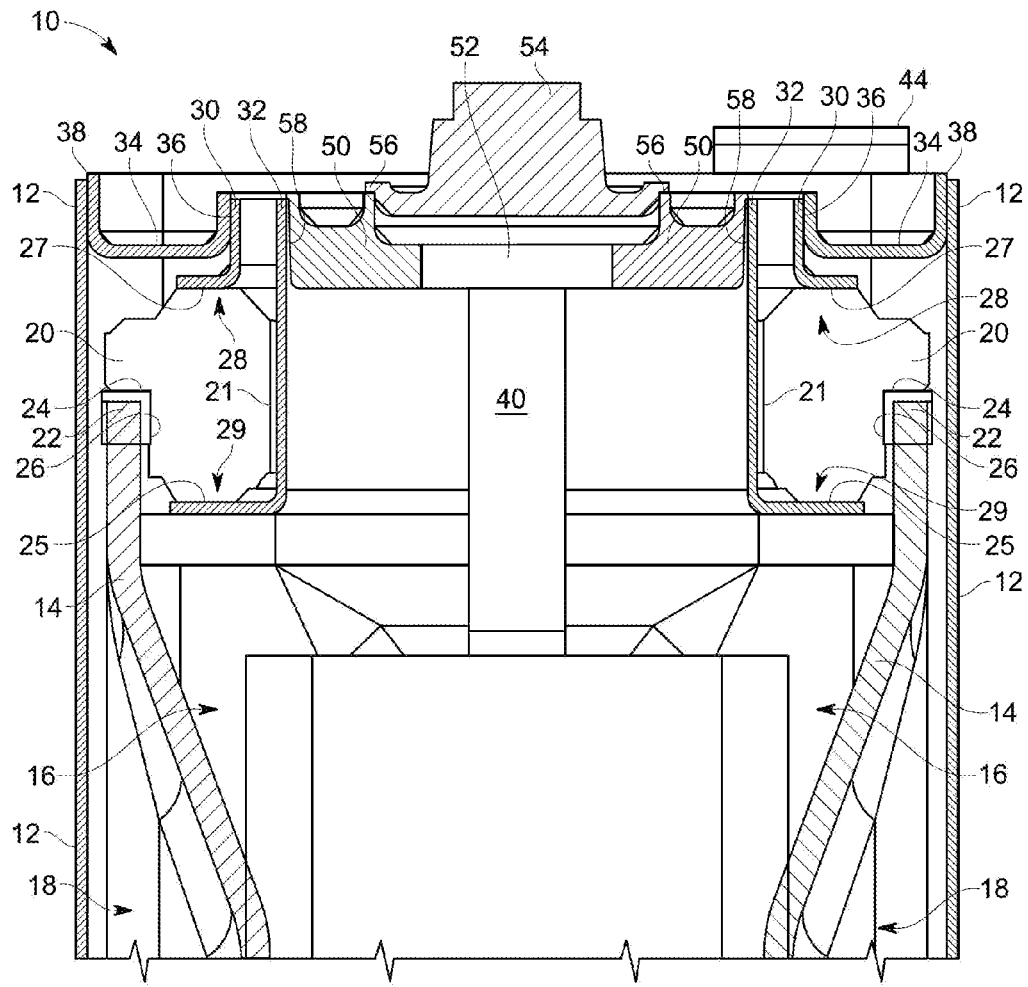
FIG. 1 is a sectional view of a portion of an illustrative prior art sodium-based thermal battery cell including prior art sealing configurations.
Figure 2:
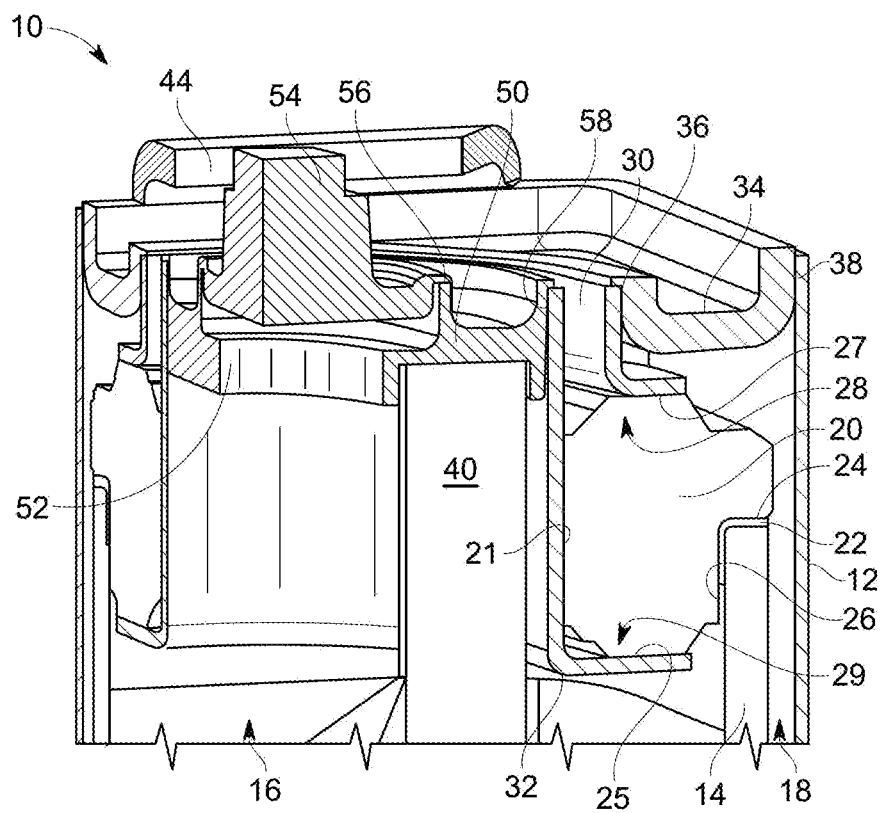
FIG. 2 is a cross sectional view of a portion of the prior art sodium-based thermal battery cell of FIG. 1.

FIGS. 1 and 2 are a cross-sectional view and a sectional view, respectively, of a portion of an exemplary prior art embodiment of a sodium-based thermal battery cell 10, such as a NaMx or sodium-sulfur battery cell. The cell 10 has an ion-conductive electrolyte separator tube 14 disposed in a metal cell case 12. The metal case may act as the anode current collector. The separator tube 14 is usually made of β"-alumina. The ceramic electrolyte separator tube 14 defines an anodic chamber 18 between the cell case 12 and the separator tube 14, and a cathodic chamber 16, inside the tube 14. The anodic chamber 18 is usually filled with an anodic material (not shown), e.g. sodium, and potentially one or more additive (i.e., anodic material). The cathodic chamber 16 may contain a cathode material (not shown) (e.g. nickel and sodium chloride), and a molten electrolyte, usually sodium chloroaluminate (NaAlCl4) along with some other additives (i.e., a cathode mixture). A cathode current collector 40 is disposed in the cathode chamber 16 such that it extends from an upper region of the cell 10 down into the cathode chamber 16 and the cathode mixture contained therein.

As shown in FIGS. 1 and 2, an electrically insulating collar 20, which may be made of alpha-alumina, zirconia, spinel, yttria, or other ceramic insulator, or combinations thereof, is situated at the top "open" end of the electrolyte separator tube 14. In one embodiment, the electrically insulating ceramic collar 20 comprises one or more of alpha-alumina, yttria, yttria stabilized zirconia, yttrium aluminum garnet, magnesia alumina spinel, and yttrium aluminate perovskite. The insulating collar 20 may include or form an internal, interior or central aperture 21 that is in communication with the interior of the electrolyte separator tube 14. The collar 20 is fitted onto the top end 170 of the separator tube 14, and is typically sealed thereto by a glass seal 22 in existing battery design. In one embodiment, the collar 20 includes an first portion or surface 24 and a second portion or surface 26 that are sealed to an upper top portion or surface and an upper inner portion or surface, respectively, of the electrolyte separator tube 14 as illustrated in FIGS. 1 and 2. In such way, the collar 20 and any components coupled thereto may be sealed to the open end of the separator tube 14.

In order to seal (e.g., hermetically seal) the cell 10 at the top end thereof (i.e., its upper region), to provide terminals for electrical access/conductivity with the cathode current collector 40 and the anode current collector (e.g., the metallic battery case 12), and to ensure the anode and cathode are chemically and physically separate from each other, the cell 10 typically includes a metal outer ring 30 and a metal inner ring 32 which are sealed or joined, respectively, with a top portion 28 and a bottom portion 29 of the collar 20, by means of hermetic seals 27, 25, respectively, as shown in FIGS. 1 and 2. In some embodiments, the terms "hermetic," "hermetically" or variations thereof as used herein with reference to one or more seals refers to a seal that is substantially airtight. In some embodiments, the term "hermetic," "hermetically" or variations thereof as used herein with reference to one or more seals refers to a seal that is effective in preventing a material contained within a cell of the battery (e.g., sodium) from escaping the cell during operating parameters or conditions (e.g., normal or typical operating parameters or conditions) of the battery (such as the operating parameters or conditions introduced herein by way of incorporation by reference below). Typically, the outer and inner rings 30, 32 are sealed to the ceramic collar 20 via seals 27, 25 resulting from a metallization and thermal compression bonding process (TCB).

The outer ring 30 may include or form an internal, interior or central aperture defining a first size and the inner ring 32 may form an internal, interior or central aperture defining a second size that is smaller, in at least one aspect, than the first size of the aperture of the outer ring 30. In some embodiments, the aperture 21 of the collar 20, the aperture of the outer ring 30, and the aperture of the inner ring 32 may be concentric as illustrated in FIGS. 1 and 2. In some embodiments, the aperture 21 of the collar 20, the aperture of the outer ring 30, and the aperture of the inner ring 32 may be substantially circular as illustrated in FIGS. 1 and 2. In some embodiments, the inner 30 and outer 32 rings may be substantially composed of nickel. In the illustrative embodiment, once the inner ring 32 is sealed (e.g., hermetically sealed) to the collar 20 and the collar 20 is sealed (e.g., hermetically sealed) to the tube 14, the cathodic chamber 16 (defined by the tube 14) may be said to be partially sealed (e.g., partially hermetically sealed) such that the interior aperture of the inner ring 32 provides the exclusive passageway into or out of the cathodic chamber 16.

As shown in FIGS. 1 and 2, the inner ring 32 may be operably electrically coupled to the cathode current collector 40 via a head member or portion 50. The head member 50 may be made from an electrically conductive material, such as a metal. In some embodiments, the head member 50 may be substantially Ni. As shown in FIGS. 1 and 2 the head member 50 may be sealed to the inner ring 32 and coupled to the cathode current collector 40 such that the cathode current collector 40 extends into the cathodic chamber 16. The head member 50 may be hermetically sealed to the inner ring 32 via one or more welds 58. The head member 50 in the illustrative prior art embodiment shown in FIGS. 1 and 2 is configured such that the joint between the head member 50 and the inner ring 32 is a lap and/or edge joint, and thereby the welds 58 therebetween is lap and/or edge weld. As is known in the art, such a weld(s) is relatively difficult to manufacture, time consuming and includes a relatively high failure rate. Such joints are therefore typically subjected to numerous inspections to ensure the reliability of the cell 10.

The head member 50 may also include or define an aperture 52 configured to allow access into the cathodic chamber 16. The head member 50 may thereby partially seal the top portion of the cathodic chamber 16 (defined by the electrolyte separator tube 14). In this way, once the inner ring 32 is sealed (e.g., hermetically sealed) to the collar 20, the collar 20 is sealed (e.g., hermetically sealed) to the tube 14, and the head member 50 is sealed (e.g., hermetically sealed) to the inner ring 32, the cathodic chamber 16 (defined by the electrolyte separator tube 14) may be said to be partially sealed (e.g., partially hermetically sealed) such that the aperture 52 of the head member 50 provides the exclusive passageway into or out of the cathodic chamber 16. The aperture 52 of the head member 50 may allow for the filling of the cathodic chamber 16 with the components of the cathode mixture.

The cell 10 may also include a cap member 54 configured to substantially seal (e.g., hermetically seal) the aperture 52 of the head member 50 when the cap member 54 is sealed, joined otherwise coupled to the head member 50. As shown in the illustrative embodiment in FIGS. 1 and 2, the cap member 54 is typically sealed to the head member 50 via one or more welds 56 that extends about the aperture 52 such that the cap member 54 and weld 56 act in concert to seal (e.g., hermetically seal) the aperture 52. The head member 50 and cap member 54 in the illustrative prior art embodiment shown in FIGS. 1 and 2 are configured such that the joint therebetween is a lap and/or edge joint, and thereby the weld(s) 56 therebetween is a lap and/or edge weld(s). As is known in the art, such a weld(s) is relatively difficult to manufacture, time consuming and has a relatively high failure rate. Such joints are therefore typically subjected to numerous inspections to ensure the reliability of the cell 10. In this way, once the inner ring 32 is sealed (e.g., hermetically sealed) to the collar 20, the collar 20 is sealed (e.g., hermetically sealed) to the electrolyte separator tube 14, the head member 50 is sealed (e.g., hermetically sealed) to the inner ring 32 the cathodic chamber 16 (defined by the tube 14), and the cap member 54 is sealed (e.g., hermetically sealed) to the head member 50 over the aperture 52, the cathodic chamber 16 is sealed (e.g., hermetically sealed).

In such a typical prior art embodiment as shown in FIGS. 1 and 2, the cathodic chamber 16 defined by the electrolyte separator tube 14 is thus hermetically sealed by four separate and distinct "seals"—the seal between the electrolyte separator tube 14 and the collar 20 (e.g., glass seal), the seal between the collar 20 and the inner ring 32 (e.g., metallization/TCB), the seal between the inner ring 32 and the head member 50 (e.g., weld), and the seal between the head member 50 and the cap member 54 (e.g., weld). The integrity (e.g., hermeticity) of these four joints is vital to the function and reliability of the cathodic chamber 16 and thus the sodium-based cell 10 (e.g., a NaMx or sodium-sulfur cell). Elimination of any of these time consuming and costly joining process steps and potential failure points is therefore desirable.

In such a prior art embodiment shown in FIGS. 1 and 2, once the cap member 54 is electrically coupled, either directly (e.g., via a weld) or indirectly, to the head member 50 the cap member 54 is electrically coupled to the cathode current collector 40 extending into the cathodic chamber 16 and the cathode mixture contained therein. The cap member 52 can thereby be used as a first terminal (i.e., a cathode terminal) for the connection of an electrical lead that can be utilized to run the cell 10 and/or draw electrical current therefrom during use (enable, at least partially, for the transport of sodium ions between anode and cathode of the cell 10).

Similar to the cathodic chamber 16, in prior art embodiments the anodic chamber 18 is typically sealed (e.g., hermetically sealed) through the use of one or more members. In the illustrative prior art embodiment shown in FIGS. 1 and 2, the cell 10 includes an outer metal ring 30 hermetically sealed to the ceramic collar 20 via a seal resulting from a metallization and TCB process. As also shown in FIGS. 1 and 2, a bridge member 34 may be electrically coupled and hermetically sealed to the outer ring 30 and the metal case 12 (which acts the anode current collector) via first and second welds 36, 36, respectively. In some embodiments the bridge member 43 is metal, such as Ni. Typically, the bridge member 34 is configured such that the joints between the bridge member 34 and the outer ring 30 and metal case 12 are lap or edge joints, and thereby the first and second welds 36, 36 therebetween are lap or edge welds. As is known in the art, such welds may be relatively difficult to manufacture, are time consuming and include relatively high failure rates. Such joints and welds are therefore typically subjected to numerous inspections to ensure the reliability of the cell 10, and elimination of any of such joints and welds would be advantageous.

In such a typical prior art embodiment as shown in FIGS. 1 and 2, the anodic chamber 18 (defined between the cell case 12 and the separator tube 14) is thus hermetically sealed by four separate and distinct "seals"—the seal between the tube 14 and the collar 20 (e.g., via glass seal), the seal between the collar 20 and the outer ring 30 (e.g., via metallization/TCB), the seal between the outer ring 30 and the bridge member 34 (e.g., via weld), and the seal between the bridge member 34 and the case 12 (e.g., via weld). The integrity (e.g., hermeticity) of these four joints or seals is vital to the function and reliability of the anodic chamber 18 and thus the cell 10. Elimination of any of these time consuming and costly joining or sealing process steps and potential failure points in sodium-based thermal battery cells is therefore desirable.

In such a prior art embodiment shown in FIGS. 1 and 2, once the bridge member 34 is electrically coupled, either directly (e.g., via a weld) or indirectly, to the case 12 the bridge member 34 is electrically coupled to the anode current collector (i.e., the case 12) and the anode material contained therein. The bridge member 34 may include a second terminal member 44 (i.e., an anode terminal) for the connection of an electrical lead that can be utilized to run the cell 10 and/or draw electrical current therefrom during use (enable, at least partially, for the transport of sodium ions between anode and cathode of the cell 10). The anode terminal 44 may be used in conjunction with the cathode terminal 54 (i.e., the cap member 54) to run the cell 10 and/or draw electrical current therefrom during use. The second terminal member 44 may be integral with the bridge member 34 or separate and distinct component coupled thereto.

Figure 3:
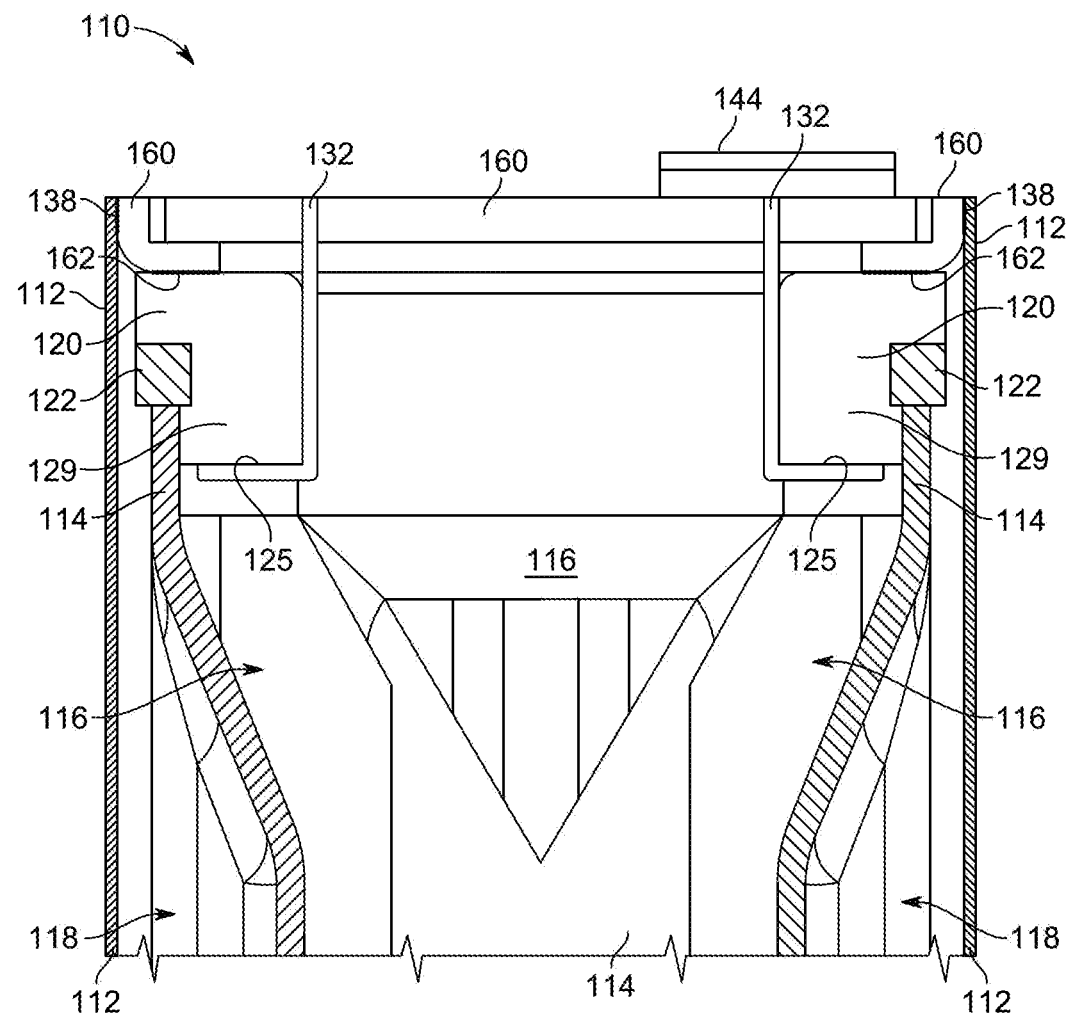
FIG. 3 is a cross sectional view of a portion of an illustrative sodium-based thermal battery cell including sealing configurations according to the present disclosure.

FIG. 3 depicts exemplary embodiments of improved sodium-based battery cell 110 sealing according to the present disclosure. In the illustrated embodiment the sodium-based battery cell 110 is a NaMx cell. In some embodiments, the sodium-based battery cell 110 is a sodium-sulfur cell. The operating parameters, conditions or the like, such as temperatures, pressures, tolerances etc., of the sodium-based battery cell 110 may be any parameter, condition or the like as discussed or disclosed in U.S. patent application Ser. No. 13/407,870 filed Sep. 29, 2012, 61/651, 817 filed May 25, 2012, Ser. No. 13/538,203 filed Jun. 29, 2012, Ser. No. 13/600,333 filed Aug. 31, 2012, Ser. No. 13/628,548 filed Sep. 27, 2012, Ser. No. 13/483,841 filed May 30, 2012 and Ser. No. 13/595,541 filed Aug. 27, 2012, all of which are expressly incorporated herein in their entirety.

As shown in FIG. 3, the exemplary NaMx cell 110 has similarities to the cell 10 shown FIGS. 1 and 2 and therefore like numerals are used to represent similar structure, components arrangements and the like and the description above to such similarities equally applies to the NaMx cell 110. Once difference between the prior art cell 10 of FIGS. 1 and 2 and the NaMx cell 110 of FIG. 3 is the bridge member 34 and the outer ring 130. As a substitute of the bridge member 34 and the outer ring 130, the illustrative NaMx cell 110 of FIG. 3 includes an integrated bridge member 160. The integrated bridge member 160 is an electrically conductive member that is operably electrically coupled and hermetically sealed to the case 112 and hermetically sealed to the collar 120. In this way, the integrated bridge member 160 hermetically seals the anodic chamber 118, at least partially, formed by the space between the case 112 and the tube 114 (and potentially the collar 120 and the bridge member 160 as well). Further, the anodic chamber 118 may include or be electrically coupled, either directly or indirectly, to a terminal member 144 (i.e., an anode terminal) for the connection of an electrical lead that can be utilized to run the NaMx cell 110 and/or draw electrical current therefrom during use (enable, at least partially, for the transport of sodium ions between anode and cathode of the NaMx cell 110). For example, the terminal member 144 may be the negatively charged terminal of the NaMx cell 110.

The illustrative integrated bridge member 160 shown in FIG. 3 extends between the collar 120 and the case 112 and about the internal aperture 121 of the collar 120. At least the portion of the integrated bridge member 160 extending between the portion of the integrated bridge member 160 sealed to the collar 120 and the portion sealed to the case 112 may be of a one-piece construction (i.e., unitary, integral, monolithic, etc.). Further, the integrated bridge member 160 may be directly sealed (e.g., hermetically sealed) to the collar 120 and directly sealed (e.g., hermetically sealed) to the case 112.

A cross-section of the integrated bridge member 160 as shown in FIG. 3 may generally define an L-shape with at least one leg of the L-shape extending generally along or adjacent to the interior surface and/or top surface of the case 112. One or more surface or portion of such a leg portion may be sealed, such as hermetically sealed, to at least one surface or portion of the case 112. For example a portion of the integrated bridge member 160 may be sealed, such as hermetically sealed, to at least one of the interior surface and/or top surface of the case 112. In some embodiments, at least one portion or surface of the integrated bridge member 160 may be sealed with the case 112 by one or welds 138. The at least one weld 138 may be any type of weld sufficient to hermetically seal the integrated bridge member 160 and the case 112. In some embodiments, the integrated bridge member 160 and the case 112 may form at least one of a lap and/or edge joint, and the at least one weld 138 (hermetically sealing the integrated bridge member 160 and the case 112) may be at least one of a lap and/or edge weld. However, any surface(s) or portion(s) of the integrated bridge member 160 and the case 112 may be sealed to one another by any other joining technique effective in producing a seal (e.g., a hermetic seal) therebetween. For example, the integrated bridge member 160 and the case 112 may be sealed to each other via at least one of a weld other than lap or edge weld, a braze, a solder, a mechanical fastener, a glue, any other type of fastening or sealing mechanism or technique effective in sealing the joint between the integrated bridge member 160 and the case 112 and combinations thereof.

As also shown in FIG. 3, the illustrative cell 10 may also include the integrated bridge member 160 sealed (e.g., hermetically sealed) to the ceramic insulating collar 120. In the illustrative embodiment shown in FIG. 3, the leg of the L-shaped collar 120 that is adjacent the leg sealed to the case 112 is sealed to the collar 120. In some embodiments, a lower surface or portion of the leg of the integrated bridge member 160 may be sealed to an upper surface of portion of the collar 120. The integrated bridge member 160 and the collar 120 may be arranged or configured in an overlapping relationship or position such that the joint therebetween is a lap, edge or similar joint, such as shown in the exemplary illustrative embodiment. In such an embodiment, the lap, edge or similar joint may be sealed (e.g., hermetically sealed) to seal the collar 120 and the integrated bridge member 160 to one another and, thereby, at least partially seal (e.g., hermetically seal) the anodic chamber 118. In embodiments where the integrated bridge member 160 is metal and the collar is ceramic, such as in the illustrative embodiments shown in FIG. 3, the integrated bridge member 160 and the collar 120 may be sealed to one another via at least one active braze process or seal 162. In other such embodiments, the integrated bridge member 160 and the collar 120 may be sealed to one another via at least one metallization and TCB process or seal. However, any surface(s) or portion(s) of the integrated bridge member 160 and the collar 120 (regardless of their makeup) may be sealed to one another by any other joining technique effective in producing a seal (e.g., a hermetic seal) therebetween. For example, the integrated bridge member 160 and the collar 112 may be sealed to each other via at least one of a weld, a braze other than an active braze, a solder, a mechanical fastener, a glue, any other type of fastening or sealing mechanism or technique effective in sealing the joint between the integrated bridge member 160 and the collar 120 and combinations thereof.

The illustrative bridge member 160 is thereby effective in sealing (e.g., hermetically sealing) the collar 112 to the case 112 and thereby sealing, at least partially, the anodic chamber 118 via only two seals—a seal between the bridge member 160 and the case 112 and a seal between the bridge member 160 and the collar 120. Stated differently, the integrated bridge member 160 may be an integral, unitary or one-piece member that is directly hermetically sealed to the case 112 and the collar 120 to at least partially seal and/or form the anodic chamber 118 of the cell 110. In such embodiments, the outer ring and the bridge member of typical prior art cells (e.g., the outer ring 30 and bridge member 34 of the illustrative prior art NaMx cell 10 of FIGS. 1 and 2) are integrated into a single one-piece member (the integrated bridge member 160) which seals the collar 120 and the case 112 and while eliminating the a seal between the outer ring and the bridge member (e.g., the seal 36 between the outer ring 30 and the bridge member 34 of the illustrative prior art cell 10 of FIGS. 1 and 2).

It is noted that the anodic chamber 118 may also be formed, at least in part, by the collar 120 and the bridge member 160 in addition to the case 112 and the tube 114, as show in FIG. 3. In such embodiments, the bridge member 160 and/or the collar 120 may be made from one or more material that is capable of withstanding the typical substances and conditions (e.g., temperatures, pressures, etc.) present in the anodic chamber 118 of NaMx cells 110 (e.g., high performance NaMx cells).

As also shown in the illustrative embodiment of FIG. 3, the collar 120 may be sealed or joined to the tube 114 to at least partially seal the anodic chamber 118 via a glass seal 122. In some embodiments, however, the collar 120 may be sealed or joined to the tube 114 via other processes or mechanism. For example, as described further below with respect to FIG. 4, the collar 120 and the tube 114 may be formed through a cosinter process wherein the 120 and the tube 114 are formed into an integral, unitary or one-piece configuration or arrangement. As another example, any surface(s) or portion(s) of the collar 120 and the tube 114 (regardless of their makeup) may be sealed to one another by any other joining technique effective in producing a seal (e.g., a hermetic seal) therebetween. For example, the collar 120 and the tube 114 may be sealed to each other via at least one of a weld, a braze, a solder, a mechanical fastener, a glue, any other type of fastening or sealing mechanism or technique effective in sealing the joint between the collar 120 and the tube 114 and combinations thereof.

The present disclosure thereby provides for NaMx cells 110 with improved advantageous sealing techniques, arrangements, configurations and/or methods. As shown in FIG. 3, the illustrative improved NaMx cell 110 includes an anodic chamber 118 sealed by a maximum of three seals—a seal 138 (e.g., via weld) between the case 112 and the integrated bridge member 160, a seal 162 between the integrated bridge member 160 and the collar 120 (e.g., via an active braze or metallization/TCB), and potentially a seal 122 between the collar 120 and the tube 114 (e.g., a glass seal). Further, in some embodiments (as described below) the seal 122 between the collar 120 and the tube 114 may essentially be eliminated by cosintering the collar 120 and the tube 114 resulting in a one-piece construction. The anodic chamber 118 may be formed between the case 112, tube 114, collar 112 (including the glass seal 122) and the integrated bridge member 160. In some embodiments, the anodic chamber 118 may contain an anodic material/mixture and such material/mixture may be substantially positioned between the case 112 and the tube 114.

In some embodiments the cathodic chamber 116 formed, at least in part, by the tube 114 may be sealed (e.g., hermetically sealed) by sealing one or more member to the collar 120 such that the internal aperture 121 that is in communication with the interior of the tube 114 is sealed (e.g., hermetically sealed). For example, the NaMx cell 110 of FIG. 3 includes an inner ring 132 sealed to the collar 120 (as in the embodiment shown in FIGS. 1 and 2). The inner ring 132 may be sealed to the collar 120 in any manner that effectuates a seal (e.g., a hermetic seal) between the inner ring 132 may be sealed to the collar 120. For example, the inner ring 132 may be hermetically sealed to the collar 120 via at least one of active brazing or metallization/TCB. The inner ring 132 may be utilized to at least one of fill the cathodic chamber 116, seal the cathodic chamber 116 and support or arrange a cathode current collector such that it is disposed in the cathode chamber 116. For example, the head member 34, cap member 54 and cathode current collector 40 described above with respect to the cell 10 of FIGS. 1 and 2 may be utilized via the inner ring 132. In other embodiments, however, the NaMx cell 110 may or may not include an inner ring 132. For example, as explained further below with respect to FIG. 4, the NaMx cell 110 may include a cathode current collector tube sealed (e.g., hermetically sealed) to the collar 120. The cathode current collector tube may define an internal aperture, and an integrated cap and terminal member may be sealed (e.g., hermetically sealed) to the current collector tube such that the internal aperture is hermetically sealed.

Figure 4:
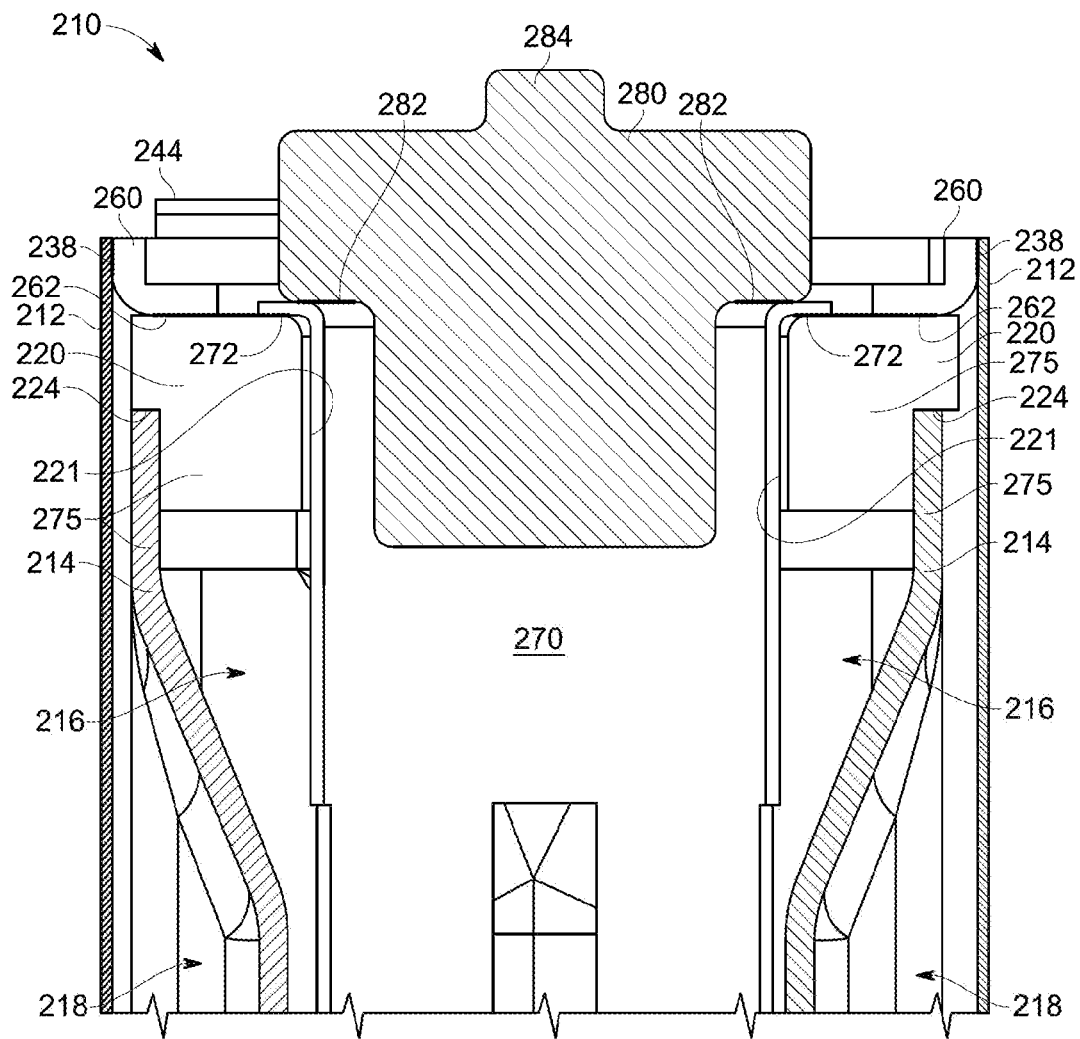
FIG. 4 is a cross sectional view of a portion of another illustrative sodium-based thermal battery cell including further sealing configurations according to the present disclosure.

Another embodiment of advantageous sodium-based battery cell sealing configurations, arrangements methods or the like according to the present disclosure is shown in FIG. 4. The illustrative sodium-based battery cell 210 is similar to the illustrative sodium-based battery cell 110 described above with reference to FIG. 3 and therefore like reference numerals preceded by the numeral "2," as opposed to "1," are used to indicate like elements, configurations and the like. The description above with respect to the other cell embodiments, and subassemblies thereof, including description regarding alternative embodiments (i.e., modifications, variations or the like), equally applies to NaMx cell 210 (and any alternative embodiments thereof). As shown in FIG. 4, inter alia, the illustrative NaMx cell 210 of FIG. 4 differs from the NaMx cell 110 of FIG. 3 in the configuration or arrangement of the alpha-alumina collar 220 and the beta-alumina tube 214 and the sealing configuration of the anodic chamber 216.

As shown in the cross-sectional view of FIG. 4, the illustrative NaMx cell 210 includes the ceramic collar 220 and the tube 214 as a one-piece, monolithic, integral or unitary component 275. Stated differently, the collar 220 and tube 214 may be portions of a unitary component 275. For example, as shown in FIG. 4 the collar portion 220 and tube portion 214 of the unitary component 275 may be made from different materials such that the unitary component 275 includes a hermetically sealed joint or transition area 224 between the collar portion 220 and tube portion 214 (i.e., between the different materials). In this way, as compared to the prior art cell 10 embodiment shown in FIGS. 1 and 2 the collar 220 and tube 214 components of the NaMx cell 220 of FIG. 4 do not need to be sealed to one another via a separate or distinct sealing operation 220 (e.g., the glass seal 20 of NaMx cell 10) after the collar 220 and tube 214 (i.e., the unitary component 275) are manufactured or formed. For example, in some embodiments the unitary component 275 may be manufactured, constructed or formed through a cosinter process wherein the collar portion 220 and tube portion 214, although consisting substantially of different material(s), are formed in the same mold such that the unitary component 275 is formed through a single cosinter process (e.g., heat and pressure) and the joint or transition area 224 between the collar 220 and tube 214 is hermetic. In some such embodiments the collar 220 may be substantially alpha-alumina and the tube 214 may be substantially beta-alumina. In one embodiment, the electrically insulating ceramic collar 220 may comprise one or more of alpha-alumina, yttria, yttria stabilized zirconia, yttrium aluminum garnet, magnesia alumina spinel, and yttrium aluminate perovskite.

As also shown in the cross-sectional view of FIG. 4, the illustrative NaMx cell 210 includes a cathode current collector tube 270 sealed to the ceramic collar 220 of the unitary component 275 and extending into the cathodic chamber 216 defined, at least in part, by the electrolyte separator tube 214 of the unitary component 275 of the cell 210. In the illustrative cell 210 embodiment shown in FIG.

4 the cathode current collector 270 is positioned within the interior aperture 221 of the collar 220 and defines a tube or tube-like structure that includes an annular lip or flange at one end that is sealed (e.g., hermetically sealed) to an upper surface or portion of the collar 220. The illustrative cathode current collector 270 includes or defines an internal aperture that may be concentric with the internal aperture 221 of the collar when the collar 220 and the cathode current collector 270 are sealed to one another. The flange of the current collector 270 and the upper surface or portion of the collar 220 (or any other surface or portion of the current collector 270 and the collar 220) may be arranged or configured in an overlapping relationship or position such that the joint therebetween is a lap, edge or similar joint, such as shown in the illustrative cell 210 embodiment of FIG. 4. In such an embodiment, the lap, edge or similar joint may be sealed (e.g., hermetically sealed) to seal the collar 220 and the current collector 270 one another and, thereby, at least partially seal (e.g., hermetically seal) the cathodic chamber 216. Further, the internal aperture of the cathode current collector 270 may be utilized to fill the cathodic chamber 216 with the cathodic mixture. As the configuration or design of the cathode current collector 270 eliminates the inner ring and head member of prior art cells, as shown in the illustrative embodiment in FIGS. 1 and 2 (e.g., the inner ring 32 and the head member 50), the internal or interior aperture of the cathode current collector 270 may be larger (e.g., defines a larger cross-section in the filling direction) than the internal or interior aperture typically provided by the head portion of prior art cells (e.g., the aperture 52 of head member 50 of the cell 10 of FIGS. 1 and 2). Thereby, the cathode current collector 270 of the NaMx cell 210 of FIG. 4 may provide for faster filling of the cathodic chamber 216 of cells 210 (e.g., NaMx cells) as compared to prior art cells. However, in alternative embodiments (not shown) the cathode current collector 270 may not define a tube or tube-like structure but may rather define a different shape, arrangement or orientation. For example the cathode current collector 270 may not include a central or internal aperture, may be "U" shaped, may include one or more wire, strip or like member that extends into the cathodic chamber 216, etc.

In the illustrative cell 210 embodiment of FIG. 4 the cathode current collector 270 and the collar 220 are hermetically sealed to one another by one or more active braze 272. For example, a braze alloy may be introduced between adjacent surfaces of the cathode current collector 270 and the collar 220 and then heated above the braze temperature to form an active braze seal (joint) between the cathode current collector 270 and the collar 220. However, any surface(s) or portion(s) of the cathode current collector 270 and the collar 220 may be sealed to one another by any other joining technique effective in producing a seal (e.g., a hermetic seal) therebetween. For example, the cathode current collector 270 and the collar 220 may be sealed to each other via at least one of a metallization/TCB, a braze other than an active braze, a weld, a solder, a mechanical fastener, a glue, any other type of fastening or sealing mechanism or technique effective in sealing the joint between the cathode current collector 270 and the collar 220 and combinations thereof. In such a way, the cathodic chamber 216 may be sealed (e.g., hermetically sealed), at least in part, by the seal 272 between the cathode current collector 270 and the collar 220.

The cathode current collector 270 may be an electrically conductive and configured to extend into the cathodic chamber 215 such that it interacts with the cathodic mixture therein. In some embodiments the cathode current collector 270 is made from an electrically conductive material, such as a metal. In some embodiments the cathode current collector 270 includes or defines a tube or tube-like structure. In some embodiments the cathode current collector 270 includes or defines one or more apertures. For example, in some embodiments the cathode current collector 270 may include or define a mesh or mesh-like portion, such as a portion that extends into the cathode chamber 216. However, as discussed above, the cathode current collector 270 may define or include any shape or configuration effective in extending into the cathodic chamber 116 to interact with the cathodic mixture therein and, ultimately, provide for or facilitate ion (e.g., Na+ ion) transfer through the ceramic electrolyte separator tube 214.

As shown in FIG. 4 the illustrate cell 210 also includes a cap member 280 configured to substantially seal (e.g., hermetically seal) the interior aperture of the cathode current collector 270 when the cap member 280 is sealed, joined otherwise coupled to the cathode current collector 270. As shown in the illustrative embodiment in FIG. 4, the cap member 280 may be sealed to the cathode current collector 270 via one or more weld 282 that extends (collectively if multiple brazes) about the aperture of the cathode current collector 270 such that the cap member 280 and weld 282 act in concert to seal (e.g., hermetically seal) the aperture and, thereby, the cathodic chamber 216. Further, the cap member 280 may thereby be operably electrically coupled to the cathode current collector 270. The cathode current collector 270 and cap member 280 in the illustrative embodiment shown in FIG. 4 are configured such that the joint therebetween is a lap and/or edge joint, and thereby the weld seal 282 therebetween is a lap and/or edge weld. However, any surface(s) or portion(s) of the cathode current collector 270 and the cap member 280 may be sealed 282 to one another by any other joining technique effective in producing a seal (e.g., a hermetic seal) therebetween and/or operably electrically coupling the cathode current collector 270 and the cap member 280. For example, the cathode current collector 270 and the cap member 280 may be sealed to each other via at least one of a braze, a thermal compression bond, a solder, a mechanical fastener, a glue, any other type of fastening or sealing mechanism or technique effective in hermetically sealing and/or operably electrically coupling the joint between the cathode current collector 270 and the cap member 280 and combinations thereof. In such a way, the cathodic chamber 216 may be sealed (e.g., hermetically sealed) and, at least in part, by the seal 282 (e.g., one or more weld) between the cathode current collector 270 and the cap member 280 and the cathode current collector 270 may be operable electrically coupled to the second terminal 284 of the cap member 280.

Therefore, in such an embodiment as shown in FIG. 4 the cathodic chamber 216 may be hermetically sealed by only two separate and distinct "seals"—the seal 272 between the insulating ceramic collar 220 and the cathode current collector 270 (e.g., one or more active braze), and the seal 282 between the cathode current collector 270 and the cap member 280 (e.g., via one or more weld). Such sealing configurations, components, assemblies and methods are advantageous as they eliminate at least one separate or distinct seal or seal location needed or necessary to hermetically seal the cathodic chamber 216 as compared to typical prior art embodiments, such as the prior art embodiment shown in FIGS. 1 and 2. For example, in reference to the illustrative typical prior art embodiment shown in FIGS. 1 and 2 the cell 10 includes three separate or distinct seals or seal locations (i.e., metallization/TCB seal 25, weld seal 58 and weld seal 56) while the cell 210 of FIG. 4 only includes two separate or distinct seals or seal locations (i.e., active braze seal 272 and weld seal 282).

As the cap member 280 may be operably electrically coupled (e.g., via at least one weld 282) to the cathode current collector 270 extending into the cathodic chamber 216 and potentially the cathode mixture contained therein, the cap member 280 itself may be electrically conductive and include a second terminal member, portion, surface or the like 284. The second terminal 284 may thereby be used as an electrical terminal (i.e., a cathode terminal) to facilitate the connection of an electrical lead that can be utilized to run the NaMx cell 210 and/or draw electrical current therefrom during use (enable or facilitate, at least partially, ion (e.g., Na+ ion) transfer through the ceramic electrolyte separator tube 214 and between anode and cathode of the NaMx cell 210). For example, the second terminal 284 (e.g., a positively charged cathode terminal) of the cap member 280 operably electrically coupled to the cathode current collector 270 may be the positively charged terminal of the NaMx cell 210 and utilized in conjunction with the first terminal 244 (e.g., a negatively charged anode terminal) operably electrically coupled to the case 212 (i.e., the anode current collector).

The shapes and/or arrangements of the components discussed or illustrated herein are only illustrative for the understanding of the cell structure; and are not meant to limit the scope of the invention. The exact shape, position, arrangement, orientation and the like of the components may vary.

The disclosure includes embodiments related to components and methods of sealing portions of an electrochemical cell, for example a metal halide battery such as a sodium-based thermal battery, for instance, a sodium-sulfur or a sodium metal halide battery, by utilizing one or more active seal resulting from a metallization/TCB technique or process. The metallization/TCB technique or process typically bonds a metal component (e.g., inner or outer rings, integrated bridge member, current collector tube, etc.) and a ceramic components (e.g., alpha-alumina collar, beta-alumina electrolyte separator tube, etc.) and is typically achieved with two main process steps: (1) metallization of the ceramic; and (2) thermal compression bonding (TCB) of the metal or metallic component to the metalized ceramic. Generally speaking, the first process step of metalizing the ceramic component provides a bond (e.g., a glass bond) between a pure Mo metallization layer and the ceramic component, and the second process step of TCB provides a diffusion bond between the Mo in the metallization layer and the metal component.

As mentioned above, to be able to join a metal component and a ceramic component in a NaMx cell via TCB, it may be necessary to initially metalize the ceramic component. Without the metallization, it is difficult to create a metallurgical bond during the TCB process between the metal and ceramic components. Metalizing of ceramic component has been practiced since the late 1940's, with the Mo—Mn process being the most studied and the most widely commercialized metallization process for ceramic (e.g., alumina). In the process, the paste material is applied to the ceramic component typically via screen printing, and heated treated (e.g., about 1500 degrees C. to about 1600 degrees C.) with wet hydrogen to bond the Mo to the ceramic component (e.g., alumina). During the heating process glass flows from the debased ceramic into the Mo layer, and the wet hydrogen may promote the wicking and wetting of the glassy phase in the ceramic into the Mo layer. However, in a NaMx cell Mn is incompatible with the chemistry used in the cell and is highly susceptible to corrosion. It is therefore necessary to use a metallization process that uses only a 100% Mo paste. Unfortunately, using 100% Mo makes the metallization process more difficult and narrows the process window by significantly restricting the operating ranges of common processing variables, temperature, dew point, and glass composition. Further TCB process is a batch-process and requires large investments to produce large number of parts. As a result, the metallization/TCB process may be time consuming, not-scalable and expensive.

Once formed, however, the Mo metallization layer provides a metal surface for the bonding of the metal or metallic and ceramic components. As mentioned above, the Mo layer is a composite comprised of two interlaced phases—Mo and glass. The subsequent thermal compression bonding (TCB) step is the formation of a metallurgical bond between the metal component and Mo metalized layer on the ceramic component (e.g., alpha-alumina collar). Specifically, the bond is created by heating the metal ceramic component and metalized ceramic component while they are in contact and relatively high pressure is applied to the joints therebetween. To create a sufficient bond, the metal and ceramic components must be subjected to relatively high temperatures (e.g., at least about 950 degrees C.), for relatively long periods of time (e.g., at least about 45 minutes) and while subjected to a significant load (e.g., at least about 750 kg force). Further, each metal and ceramic components subassembly must be individually arranged or processed such that the components are properly positioned and oriented and the compressive load is applied to the joint therebetween. Thereby, the TCB process itself may also time consuming and expensive.

Although the metallization and TCB process is difficult, time consuming and expensive, it is the typical process to bond alpha-alumina collars in NaMx cells with metal or metallic components due to the relatively high bond strength achieved thereby. In fact, the main advantage or CTQ (Critical to Customer) parameter of the metallization and TCB sub-assembly is the metal-to-ceramic bond strength achieved between metal and ceramic components, along with hermeticity of the bond. The strength of the TCB bond between metal and ceramic components is controlled by a wide range of variables inherent to the components of the TCB subassembly to ensure sufficient bond strength is achieved. The microstructure of the ceramic component (e.g., alpha-alumina collar) and the Mo metallization, along with the TCB process heavily influence the final strength of the metal-to-ceramic bond. With upwards of forty different processing steps needed to manufacture the TCB subassembly, it is necessary to develop a quality control plan for all components of the subassembly. Again, the process to achieve the TCB subassembly (metalized alumina collar and TCB collar and Ni rings) is thereby difficult to achieve, non scalable, expensive and time consuming. As a result, to advantageously avoid the difficulties, expense and time associated with the metallization and TCB process typically associated with the manufacturing of NaMx cells, alternate joining technologies for the Ni rings and alpha-alumina collar that achieve sufficient bond strength are necessary.

The disclosure includes embodiments related to components and methods of sealing portions of an electrochemical cell, for example a metal halide battery such as a sodium-based thermal battery, for instance, a sodium/sulfur or a sodium metal halide battery, by utilizing one or more active braze. The disclosure includes embodiments related to components and methods of sealing portions of an electrochemical cell, for example a metal halide battery such as a sodium-based thermal battery, for instance, a sodium-sulfur or a sodium metal halide battery, by utilizing one or more active braze. Any of the active brazes describe herein may include, or be performed according to, the specifications, characteristics, materials, temperatures, pressures, procedures, techniques, methods, etc. discussed or disclosed in U.S. patent application Ser. No. 13/407,870 filed Sep. 29, 2012, 61/651,817 filed May 25, 2012, Ser. No. 13/538,203 filed Jun. 29, 2012, Ser. No. 13/600,333 filed Aug. 31, 2012, Ser. No. 13/628,548 filed Sep. 27, 2012, Ser. No. 13/483,841 filed May 30, 2012 and Ser. No. 13/595,541 filed Aug. 27, 2012, all of which are expressly incorporated herein in their entirety.

An active braze, as used herein, utilizes an active braze alloy composition. In these embodiments, a braze alloy composition may be introduced between a first component (e.g., a collar) comprised of a ceramic and second components (e.g., ring, integrated bridge member, current collector tube 270), potentially metallic, to be joined. The first and second components may then heated to form an active braze seal (joint) between the first component and the second component(s).

In one particular embodiment, the same braze alloy composition can be used to join all components in the same heating cycle. By eliminating the need for metallization and TCB, these embodiments allow for fewer steps to be undertaken, decreasing the cost and time of the fabrication of NaMx cells. Though the present discussion provides examples in the context of a sodium-based thermal battery, such as a metal halide battery, these processes can be applied to many other applications which utilize ceramic collar and metallic component joining.

The use of active brazing in embodiments of this disclosure has a number of benefits. First, it reduces the number of steps necessary involved with metallization of the alpha alumina collar. Secondly, it reduces the high temperature processing involved with metallization of the alpha alumina collar. Further, utilizing active brazing with the improved sealing configurations, components, assemblies and methods of the present disclosure provide cells that are long lasting and is highly reliable. Finally, active brazing is very cost effective and a relatively quick process. In short, active brazing with the sealing configurations, components, assemblies and methods of the present disclosure in NaMx cells decreases the number of process steps, reduces costs, decreases manufacturing time, and results in cells that are reliable and include satisfactory performance characteristics compared to cells resulting from the prior art metallization and TCB processes sealing configurations, components, assemblies and methods. The brazing alloys used herein may be suitable for use in high temperature rechargeable batteries, compatible with the battery chemistry and able to be brazed below 1250° C.

Typically, "brazing" uses a braze material (usually an alloy) having a lower liquidus temperature than the melting points of the components (i.e. their materials) to be joined (e.g., metal components and an alpha-alumina collar). The braze material is brought to or slightly above its melting (or liquidus) temperature while protected by a suitable atmosphere. The braze material then flows over the components (known as wetting), and is then cooled to join the components together. As used herein, "braze alloy composition" or "braze alloy", "braze material" or "brazing alloy", refers to a composition that has the ability to wet the components to be joined, and to seal them. A braze alloy for a particular application should withstand the service conditions required and melt at a lower temperature than the base materials or melt at a very specific temperature. Conventional braze alloys usually do not wet ceramic surfaces sufficiently to form a strong bond at the interface of a joint. In addition, the alloys may be prone to sodium and halide corrosion.

As used herein, the term "brazing temperature" refers to a temperature to which a brazing structure is heated to enable a braze alloy to wet the components to be joined, and to form a brazed joint or seal. The brazing temperature is often higher than or equal to the liquidus temperature of the braze alloy. In addition, the brazing temperature should be lower than the temperature at which the components to be joined may not remain chemically, compositionally, and mechanically stable. There may be several other factors that influence the brazing temperature selection, as those skilled in the art understand.

Embodiments of the present invention utilize a braze alloy composition capable of forming a joint by "active brazing" or on ore more "active brazes." In some specific embodiments, the composition also has high resistance to sodium and halide corrosion. In some embodiments, the braze alloy composition includes nickel and an active metal element, and further comprises a) germanium, b) niobium and chromium or c) silicon and boron. Alternatively, the braze alloy composition may comprise copper, nickel and an active metal element. Each of the elements of the alloy contributes to at least one property of the overall braze composition, such as liquidus temperature, coefficient of thermal expansion, flowability or wettability of the braze alloy with a ceramic, and corrosion resistance.

"Active brazing" is a brazing approach often used to join a ceramic to a metal or a metal alloy, or a ceramic to a ceramic. Active brazing uses an active metal element that promotes wetting of a ceramic surface, enhancing the capability of providing a seal (e.g., a hermetic seal). "Sealing", as used herein, is a function performed by a structure that joins other structures together, to reduce or prevent leakage through the joint between the other structures. The seal structure may also be referred to as a "seal." An "active metal element", as used herein, refers to a reactive metal that has higher affinity to the oxygen compared to the affinity of element in ceramic and thereby reacts with the ceramic. A braze alloy composition containing an active metal element can also be referred to as an "active braze alloy." The active metal element undergoes a decomposition reaction with the ceramic, when the braze alloy is in molten state, and leads to the formation of a thin reaction layer on the interface of the ceramic and the braze alloy. The thin reaction layer allows the braze alloy to wet the ceramic surface, resulting in the formation of a ceramic-metal joint/bond, which may also be referred to as "active braze seal."

Thus, an active metal element is an essential constituent of a braze alloy for employing active brazing. A variety of suitable active metal elements may be used to form the active braze alloy. The selection of a suitable active metal element mainly depends on the chemical reaction with the ceramic (e.g., alpha-alumina of the collar) to form a uniform and continuous reaction layer, and the capability of the active metal element of forming an alloy with a base alloy (e.g. Ni—Ge alloy). An 'active' element will react with the ceramic, forming a reaction layer between the ceramic and the molten braze that will reduce the interfacial energy to such a level that wetting of the ceramic takes place. The active metal element for embodiments herein is often titanium. Other suitable examples of the active metal element include, but are not limited to, zirconium, hafnium, and vanadium. A combination of two or more active metal elements may also be used. In some specific embodiments, the braze alloy includes titanium.

The presence and the amount of the active metal may influence the thickness and the quality of the thin reactive layer, which contributes to the wettability or flowability of the braze alloy, and therefore, the bond strength of the resulting joint. The active metal element is generally present in small amounts suitable for improving the wetting of the ceramic surface, and forming the thin reaction layer, for example, less than about 10 microns. A high amount of the active metal layer may cause or accelerate halide corrosion.

The braze alloy composition may further include at least one alloying element. The alloying element may provide further adjustments in several required properties of the braze alloy, for example coefficient of thermal expansion, liquidus temperature and brazing temperature. In one embodiment, the alloying element can include, but is not limited to, cobalt, iron, chromium, niobium or a combination thereof.

It is to be understood that the above description is intended to be illustrative, and not restrictive. Numerous changes and modifications may be made herein by one of ordinary skill in the art without departing from the general spirit and scope of the invention as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably" in conjunction with terms such as coupled, connected, joined, sealed or the like is used herein to refer to both connections resulting from separate, distinct components being directly or indirectly coupled and components being integrally formed (i.e., one-piece, integral or monolithic). Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A sub-assembly for at least partially sealing a cell of a sodium-based thermal battery, the sub-assembly including:
   an electrically conductive case;
   an electrolyte separator tube positioned within the case and defining, at least in part, a cathodic chamber with an opening;
   a ceramic collar positioned at the opening of the cathodic chamber of the electrolyte separator tube and defining an aperture in communication with the opening and the cathodic chamber; and
   an integrated bridge member,
   wherein the electrically conductive case, electrolyte separator tube, ceramic collar, and integrated bridge member define, at least in part, an anodic chamber therebetween, and wherein the integrated bridge member is hermetically sealed and operable electrically coupled to the metal case and hermetically sealed to the ceramic collar to hermetically seal, at least in part, the cathodic chamber.

2. The sub-assembly of claim 1, wherein the integrated bridge member is hermetically sealed and operable electrically coupled to the metal case via at least one weld.

3. The sub-assembly of claim 1, wherein the integrated bridge member is hermetically sealed and operable electrically coupled to the ceramic collar via at least one active braze.

4. The sub-assembly of claim 1, wherein at least the portion of the integrated bridge member that extends between the portion thereof hermetically sealed to the electrically conductive case and the portion thereof hermetically sealed to the ceramic collar is of one-piece construction.

5. The sub-assembly of claim 1, wherein the integrated bridge member is electrically conductive and includes an aperture in communication with the aperture of the ceramic collar and the cathodic chamber, wherein the sub-assembly includes an electrically conductive current collector directly or indirectly sealed to the ceramic collar and extending into the cathodic chamber, and wherein the ceramic collar electrically insulates the integrated bridge member and the current collector.

6. The sub-assembly of claim 1, wherein the electrolyte separator tube and ceramic collar are separate and distinct components hermetically sealed to one another.

7. The sub-assembly of claim 1, wherein the electrolyte separator tube and ceramic collar are portions of a one-piece member.

8. The sub-assembly of claim 7, wherein the electrolyte separator tube portion of the one-piece member is substantially beta-alumina and the ceramic collar portion of the one-piece member is substantially alpha-alumna, and wherein the one-piece member is formed by cosintering the electrolyte separator tube and ceramic collar portions.

9. A sodium-based thermal battery with at least one cell including a hermetically sealed anodic chamber, the battery including:
- an electrically conductive case;
- an electrolyte separator tube positioned within the case;
- a ceramic collar; and
- an integrated bridge member,
- wherein the electrically conductive case, electrolyte separator tube, ceramic collar, and integrated bridge member define, at least in part, the anodic chamber therebetween, and wherein the integrated bridge member is hermetically sealed and operable electrically coupled to the metal case and hermetically sealed to the ceramic collar.

10. The battery of claim 9, wherein the integrated bridge member is hermetically sealed and operable electrically coupled to the metal case via at least one weld, and wherein the integrated bridge member is hermetically sealed to the ceramic collar via at least one active braze.

11. The battery of claim 9, wherein the electrolyte separator tube and ceramic collar are separate and distinct components hermetically sealed to one another.

12. The battery of claim 9, wherein the electrolyte separator tube and ceramic collar are portions of a one-piece member.

13. The battery of claim 12, wherein the electrolyte separator tube portion of the one-piece member is substantially beta-alumina and the ceramic collar portion of the one-piece member is substantially alpha-alumna, and wherein the electrolyte separator tube and ceramic collar portions are cosintered to form the one-piece member.

14. The battery of claim 9, wherein the electrolyte separator tube defines, at least in part, a cathodic chamber with an opening, and wherein the ceramic collar is positioned at the opening of the cathodic chamber of the electrolyte separator tube and defines an aperture in communication with the cathodic chamber.

15. The battery of claim 14, wherein the integrated bridge member is electrically conductive and includes an aperture in communication with the aperture of the ceramic collar and the cathodic chamber, wherein the battery includes an electrically conductive current collector directly and indirectly sealed to the ceramic collar and extending into the cathodic chamber, and wherein the ceramic collar electrically insulates the integrated bridge member and the current collector.

16. A method of at least partially sealing an anodic chamber a cell of a sodium-based rechargeable thermal battery, the method including:
- obtaining an electrically conductive case;
- positioning an electrolyte separator tube and a ceramic collar within the case such that the anodic chamber is formed, in part, between the case and the electrolyte separator tube and ceramic collar, wherein in the electrolyte separator tube defines a cathodic chamber;
- hermetically sealing and operably electrically coupling an integrated bridge member to the case; and
- hermetically sealing the integrated bridge member to the ceramic collar.

17. The method of claim 16, wherein hermetically sealing and operably electrically coupling the integrated bridge member to the electrically conductive case includes welding the integrated bridge member and the electrically conductive case to one another.

18. The method of claim 16, wherein hermetically sealing the integrated bridge member to the ceramic collar includes active brazing the integrated bridge member and the ceramic collar to one another.

19. The method of claim 16, wherein the electrolyte separator tube and the ceramic collar are separate and distinct components, and wherein the method further includes:
- obtaining the distinct electrolyte separator tube;
- obtaining the distinct ceramic collar; and
- hermetically sealing the distinct electrolyte separator tube and the distinct ceramic collar to one another.

20. The method of claim 16, further including cosintering beta-alumina and at least one of alpha-alumina, yttria, yttria stabilized zirconia, yttrium aluminum garnet, magnesia alumina spinel, and yttrium aluminate perovskite to form a one-piece member including a beta-alumina portioning defining the electrolyte separator tube and a portion defining the ceramic collar including at least one of alpha-alumina, yttria, yttria stabilized zirconia, yttrium aluminum garnet, magnesia alumina spinel, and yttrium aluminate perovskite.

* * * * *